United States Patent
Mohalik et al.

(10) Patent No.: US 11,381,644 B2
(45) Date of Patent: Jul. 5, 2022

(54) DEVICES AND METHODS FOR QOS DETERMINATION OF IOT-BASED APPLICATIONS

(71) Applicant: Telefonaktiebolaget LM Ericsson (publ), Stockholm (SE)

(72) Inventors: Swarup Kumar Mohalik, Bangalore (IN); Salem Abid Ahmed, Chennai (IN); Rana Pratap Sircar, Haryana (IN); Ramani Venkatakrishnan, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/980,691

(22) PCT Filed: Mar. 15, 2018

(86) PCT No.: PCT/IN2018/050141
§ 371 (c)(1),
(2) Date: Sep. 14, 2020

(87) PCT Pub. No.: WO2019/175886
PCT Pub. Date: Sep. 19, 2019

(65) Prior Publication Data
US 2021/0014310 A1 Jan. 14, 2021

(51) Int. Cl.
*H04L 67/12* (2022.01)
*G16Y 40/35* (2020.01)
(Continued)

(52) U.S. Cl.
CPC .............. *H04L 67/12* (2013.01); *G16Y 40/35* (2020.01); *H04L 41/5067* (2013.01);
(Continued)

(58) Field of Classification Search
CPC . H04L 67/12; H04L 67/1076; H04L 67/1078; H04L 67/322; H04L 41/5067; H04L 43/08; G16Y 40/35
See application file for complete search history.

(56) References Cited

U.S. PATENT DOCUMENTS 7,596,373 B2 * 9/2009 McGregor ........... H04B 17/309
455/425
10,085,173 B2 * 9/2018 Zhang ................... H04W 28/24
(Continued)

FOREIGN PATENT DOCUMENTS

WO  2015/133942 A1  9/2015
WO  2017/024100 A1  2/2017

OTHER PUBLICATIONS

Saha, Niloy, Samaresh Bera, Sudip Misra, "Sway: Traffic-Aware QoS Routing in Software-Defined IoT", Jun. 14, 2018, IEEE, vol. 9, pp. 390-401. (Year: 2018).*
(Continued)

*Primary Examiner* — Nam T Tran
(74) *Attorney, Agent, or Firm* — Rothwell, Figg, Ernst & Manbeck, P.C.

(57) ABSTRACT

The invention relates to method and devices of enabling determination of overall Quality of Service (QoS) of at least one Internet of Things (IoT) device. In an aspect of the invention, a method of a network node (10a) is provided of enabling determining of an overall QoS of at least one IoT device. The method comprises transmitting (S101), to a device connectivity middleware (DCM) node (14), an identifier of said at least one IoT device (11a) for which a QoS measure is to be acquired, receiving (S102), from the DCM node (14), a network profile of the IoT device (11a) associated with said identifier, transmitting (S103), to a Service Capability Exposure Function (SCEF, 15), a request for the QoS measure of the IoT device (11a) for the received
(Continued)

network profile, the SCEF (15) acquiring the QoS measure from a Policy and Charging Control (PCC) function (16), receiving (S106), from the SCEF, the requested QoS measure of the IoT device (11*a*), transmitting (S107), to a Lightweight Machine-to-Machine (LWM2M) device (13), a request for availability information for said at least one IoT device (10*a*), and receiving (S108), from the LWM2M device (13), the requested availability information, wherein the received QoS measure and the availability information is taken into account for determining the overall QoS of said at least one IoT device (11*a*).

18 Claims, 5 Drawing Sheets

(51) Int. Cl.
    *H04L 67/1074*      (2022.01)
    *H04L 67/61*      (2022.01)
    *H04L 41/5067*      (2022.01)
    *H04L 43/08*      (2022.01)

(52) U.S. Cl.
    CPC .......... *H04L 43/08* (2013.01); *H04L 67/1076* (2013.01); *H04L 67/1078* (2013.01); *H04L 67/322* (2013.01)

(56) References Cited

U.S. PATENT DOCUMENTS

| | | | |
|---|---|---|---|
| 10,469,353 B2* | 11/2019 | Dahlman | H04L 43/0811 |
| 10,742,744 B1* | 8/2020 | Mahalank | H04L 67/16 |
| 2005/0163047 A1 | 7/2005 | McGregor et al. | |
| 2012/0002540 A1* | 1/2012 | Siddam | H04W 28/24 370/230 |
| 2017/0041231 A1* | 2/2017 | Seed | H04L 67/12 |
| 2017/0070413 A1 | 3/2017 | Dahlman et al. | |
| 2017/0347283 A1* | 11/2017 | Kodaypak | H04L 67/12 |
| 2018/0359621 A1* | 12/2018 | Singhal | H04L 67/12 |

OTHER PUBLICATIONS

International Search Report and Written Opinion issued in International Application No. PCT/IN2018/050141 dated Jun. 2018 (12 pages).

Ravi C Bhaddurgatte et al., "A Review: QoS Architecture and Implementations in IoT Environment", Research & Reviews: Journal of Engineering and Technology, ISSN: 2319-9873, Jul. 2015 (7 pages).

Ren Duan et al., "A QoS Architecture for IoT", 2011 IEEE International Conferences on Internet of Things, and Cyber, Physical and Social Computing, 2011 (4 pages).

Jayavardhana Gubbi et al., "Internet of Things (IoT): A vision, architectural elements, and future directions", Future Generation Computer Systems 29, 2013 (16 pages).

Martina Marjanović et al., "D4.6. Quality of Service (QoS) for IoT services", UNIZG-FER, OpenIoT-D46-140527-Draft, Aug. 2014 (52 pages).

Awatif Alqahtani et al., "End-to-End QoS Specification and Monitoring in the Internet of Things", Engineering, 2016 (5 pages).

Solace, "Understanding IoT Protocols—Matching your Requirements to the Right Option", Jan. 25, 2017 (18 pages).

Gemalto, "Quality of Service for IoT", Quality of Service for IoT, Mar. 2018 (3 pages).

Andreas Kunz et al., "Enhanced 3GPP system for Machine Type Communications and Internet of Things", 2015 IEEE Conference on Standards for Communications and Networking (CSCN), Oct. 28, 2015 (pp. 48-53).

\* cited by examiner

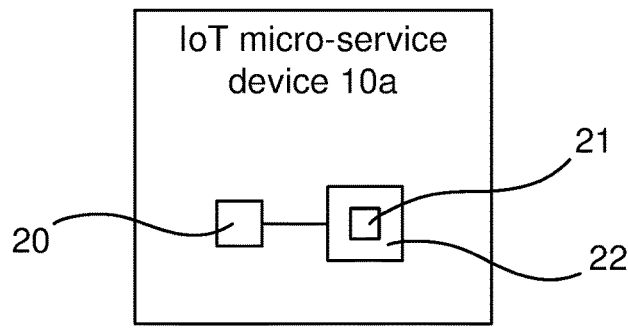
Fig. 5
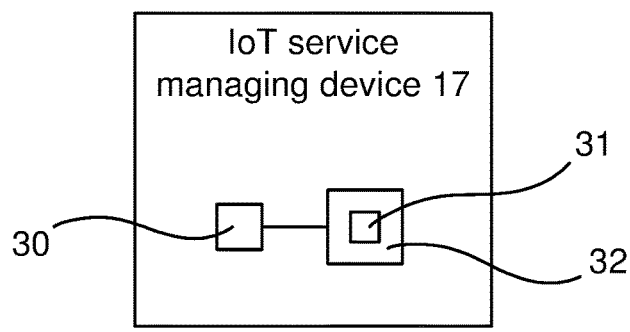
Fig. 6
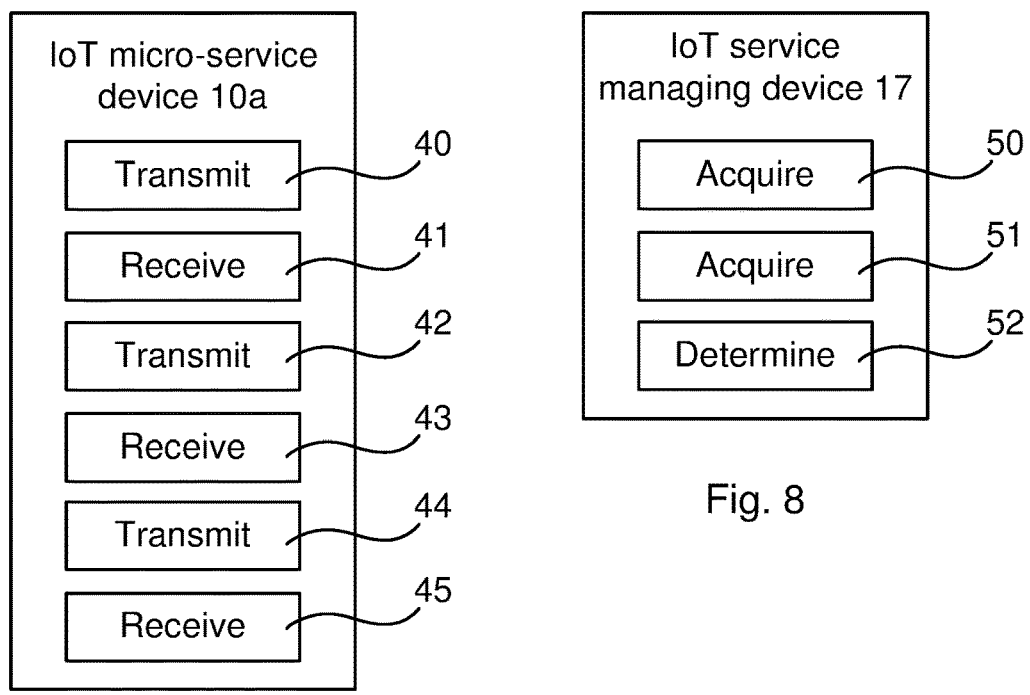
Fig. 7
Fig. 8

DEVICES AND METHODS FOR QOS DETERMINATION OF IOT-BASED APPLICATIONS

CROSS REFERENCE TO RELATED APPLICATION(S)

This application is a 35 U.S.C. § 371 National Stage of International Patent Application No. PCT/IN2018/050141, filed Mar. 15, 2018, designating the United States.

TECHNICAL FIELD

The invention relates to method and devices of enabling determination of overall Quality of Service (QoS) of at least one Internet of Things (IoT) device. The invention further relates to computer programs comprising computer-executable instructions for causing devices to perform steps recited in methods according to embodiment when the computer-executable instructions are executed on a processing unit included in the network node. Still further, the invention relates to computer program products comprising a computer readable medium, the computer readable medium having the computer programs embodied thereon.

BACKGROUND

In networks comprising Internet of Things (IoT) devices such as e.g. thermostats, light bulbs, television sets, door locks, refrigerators, smart grids, cars, etc., large-scale IoT applications involving hundreds or even thousands of IoT devices can be created.

For such large-scale IoT applications to be possible, it will be necessary to supervise and coordinate the great number of IoT devices, in particular as regards performance monitoring of the IoT devices.

In current IoT networks, such supervision and coordination of IoT device resources is not possible, in that required information for determining performance of the IoT devices forming the large-scale IoT applications is not available.

SUMMARY

An object of the present invention is to solve, or at least mitigate, this problem in the art and to provide an improved method of determining performance of IoT devices in a network.

This object is attained in a first aspect of the invention by a method of a network node for enabling determining of an overall Quality of Service (QoS) of at least one IoT device. The method comprises transmitting, to a device connectivity middleware (DCM) node, an identifier of said at least one IoT device for which a QoS measure is to be acquired, receiving, from the DCM node, a network profile of the IoT device associated with said identifier, transmitting, to a Service Capability Exposure Function (SCEF), a request for the QoS measure of the IoT device for the received network profile, the SCEF acquiring the QoS measure from a Policy and Charging Control (PCC) function, receiving, from the SCEF, the requested QoS measure of the IoT device, transmitting, to a Lightweight Machine-to-Machine (LWM2M) device, a request for availability information for said at least one IoT device, and receiving, from the LWM2M device, the requested availability information, wherein the received QoS measure and the availability information is taken into account for determining the overall QoS of said at least one IoT device.

This object is attained in a second aspect of the invention by a network node configured to enable determining of an overall QoS of at least one IoT device. The network node comprises a processing unit and a memory, said memory containing instructions executable by said processing unit, whereby the network node is operative to transmit, to a DCM node, an identifier of said at least one IoT device for which a QoS measure is to be acquired, receive, from the DCM node, a network profile of the IoT device associated with said identifier, transmit to a SCEF a request for the QoS measure of the IoT device for the received network profile, the SCEF acquiring the QoS measure from a PCC function, receive, from the SCEF, the requested QoS measure of the IoT device, transmit, to an LWM2M device, a request for availability information for said at least one IoT device, and receive, from the LWM2M device, the requested availability information, wherein the received QoS measure and the availability information is taken into account for determining the overall QoS of said at least one IoT device.

This object is attained in a third aspect of the invention by a method of an IoT service managing device of determining an overall QoS for a group of IoT devices from QoS measures and availability information acquired by at least two network nodes according to the second aspect. The method comprises acquiring, from a first of the at least two network nodes, the QoS measure and the availability information of a first of the at least two IoT devices, acquiring, from a second of the at least two network nodes, the QoS measure and the availability information of a second of the at least two IoT devices, and determining an overall QoS for the group of at least two IoT devices based on the individual QoS measure and availability information of the first IoT device and the individual QoS measure and availability information of the second IoT device.

This object is attained in a fourth aspect of the invention by an IoT service managing device configured to determine an overall QoS for a group of IoT devices from QoS measures and availability information acquired by at least two network nodes according to the second aspect. The IoT service managing device comprises a processing unit and a memory, said memory containing instructions executable by said processing unit, whereby the IoT service managing device is operative to acquire, from a first of the at least two network nodes, the QoS measure and the availability information of a first of the at least two IoT devices, acquire, from a second of the at least two network nodes, the QoS measure and the availability information of a second of the at least two IoT devices, and determine an overall QoS for the group of at least two IoT devices based on the individual QoS measure and availability information of the first IoT device and the individual QoS measure and availability information of the second IoT device.

Hence, the network node of the second aspect, referred to in the following as an IoT micro-service device, acquires a QoS measure of an IoT device by initially transmitting an identifier of at least one IoT device for which the QoS measure is to be acquired to the DCM. It is noted that the IoT micro-service device may request QoS measures for a great number of IoT devices, in which case it could provide the DCM node with a corresponding number of identifiers.

The DCM node responds by transmitting the network profile of the IoT device, such that a QoS measure of the IoT device subsequently can be obtained form the 3GPP network by the micro-service device.

After having received the network profile, the IoT micro-service device transmits a request for the QoS measure of the IoT device comprising the network profile to the SCEF, which in its turn will forward the request to the PCC function.

The PCC function stores QoS information associated with the received network profile of the concerned IoT device and accordingly fetches a QoS measure and returns the QoS measure to the SCEF, which forwards the received QoS measure to the IoT micro-service device.

Hence, the micro-service device now has access to the requested QoS measure of the IoT device, which is based on parameters such as for instance bandwidth, latency and location of the IoT device, or a combination of a plurality of parameters. Latency is typically determined by a combination of parameters such as delay, jitter, packet loss, etc., and may further be dependent on types of payload such as e.g. speech, streaming video, online gaming, etc.

Further, the IoT micro-service device transmits a request for availability information of the IoT device to the LWM2M device, which fetches the availability information of IoT device from an internal storage and returns the availability information to the micro-service device. The availability information comprises for instance current battery power level, load and discharge rate, etc., of the IoT device.

The IoT micro-service device thus has access to both a QoS measure of the IoT device as well as availability information of the IoT device. Advantageously, with the described embodiment, an overall QoS can be determined for the IoT device.

For instance, the QoS measure may indicate that the IoT device is capable of acquiring data and transmitting such data to the micro-service device at a high bandwidth. However, the availability information may indicate that the IoT device is close to running out of battery power. This may affect the overall QoS of the IoT device in the sense that the overall QoS of the IoT device may decrease when taking into account the poorer availability as compared to a scenario where only the (high) QoS bandwidth figure is taken into account.

Further advantageous with the described embodiment, it is possible for a group of IoT micro-service devices to supervise and coordinate a plurality of IoT devices. This may be performed by having the IoT micro-service devices intercommunicate with each other to build large-scale IoT applications.

In a further aspect, the IoT service managing device may collect, from the IoT micro-service devices, the QoS measures and availability information of the IoT devices and thus handle the supervision and coordination of IoT device resources, which advantageously will give the IoT service managing device a "bird's eye view" as regards the capabilities of the IoT devices.

In yet an embodiment, the determining of the overall QoS of one or more IoT devices further advantageously comprises predicting a future overall QoS from determined overall QoS values.

For instance, by analyzing a current battery charge level of a particular IoT device, an IoT micro-service device and/or the IoT service managing device may predict that the battery will be more or less discharged after a given time period, which hence will affect the overall QoS of the particular IoT device.

In a fifth aspect of the invention, a computer program is provided comprising computer-executable instructions for causing a network node to perform steps recited in the method of the first aspect when the computer-executable instructions are executed on a processing unit included in the network node.

In a sixth aspect of the invention, a computer program product is provided comprising a computer readable medium, the computer readable medium having the computer program of the fifth aspect embodied thereon.

In a seventh aspect of the invention, a computer program is provided comprising computer-executable instructions for causing an IoT service managing device to perform steps of the method of the third aspect when the computer-executable instructions are executed on a processing unit included in the IoT service managing device.

In an eighth aspect of the invention, a computer program product is provided comprising a computer readable medium, the computer readable medium having the computer program of the seventh aspect embodied thereon.

Further embodiments will be discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 illustrates an IoT micro-service device according to an embodiment;

FIG. 6 illustrates an IoT service managing device according to an embodiment;

FIG. 7 illustrates an IoT micro-service device according to another embodiment; and FIG. 8 illustrates an IoT service managing device according to another embodiment.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
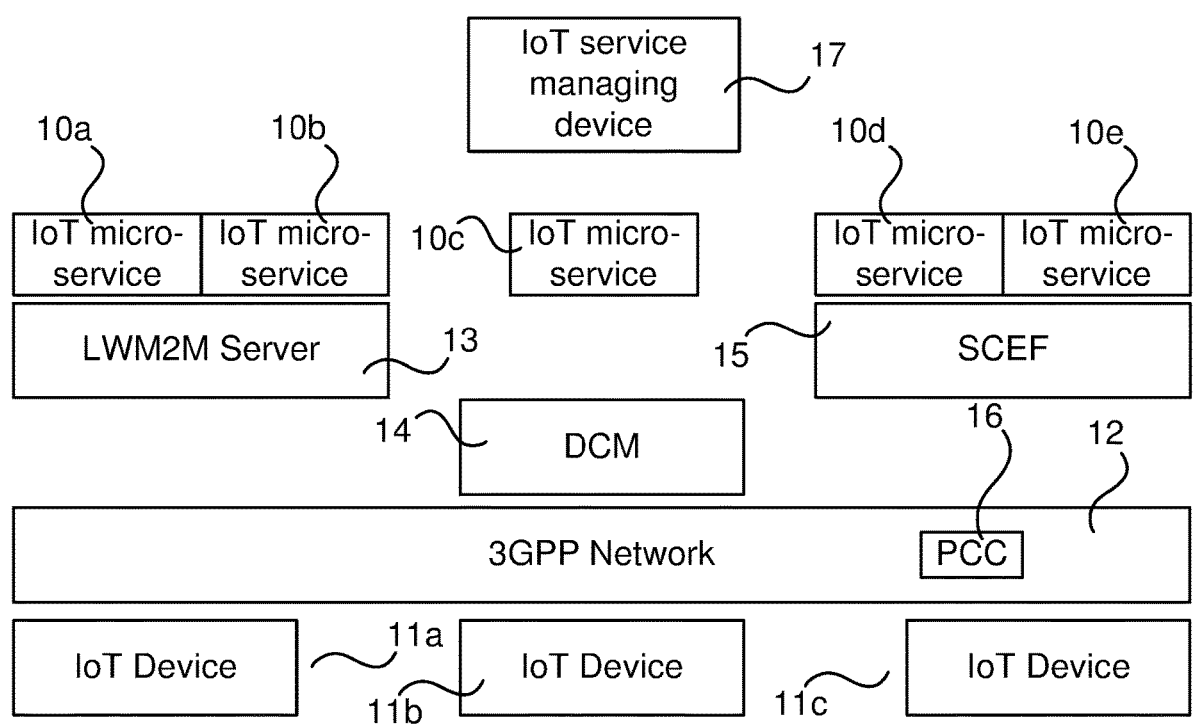
FIG. 1 illustrates a communication network implementing a plurality of network nodes according to an embodiment, which nodes are referred as IoT micro-service devices.

FIG. 1 illustrates a communication network implementing a plurality of network nodes according to an embodiment, which nodes are referred as IoT micro-service devices 10a-10e. Each of the micro-service devices is capable of connecting to one or more IoT devices 11a-11c via a network, in this particular exemplifying embodiment being a 3rd Generation Partnership Project (3GGP) type network 12, such as a Universal Mobile Telephone System (UMTS), a Long Term Evolution (LTE) system or even a next-generation 5G system.

The IoT devices 11a-11c may be embodied in the form of thermostats, light bulbs, television sets, door locks, refrigerators, smart grids, cars, etc. In practice, the network of FIG. 1 may comprise hundreds and even thousands of IoT devices. For instance, it may be envisaged that the network of FIG. 1 is implemented in a factory environment, where thousands of IoT sensors and actuators are to be communicated with and/or controlled.

To enable an IoT micro-service device 10a-10e to communicate with one or more of the IoT devices 11a-11c a protocol known as Lightweight Machine-to-Machine (LWM2M) is implemented. Hence, each IoT micro-service device 10a-10e communicates by means of LWM2M with an LWM2M server 13, which in its turn connects to the IoT devices 11a-11c via the 3GPP network 12.

The IoT micro-service devices 10a-10e may fetch data of the IoT devices 11a-11c via the LWM2M server 13, and also availability information of the IoT devices 11a-11c, for instance current battery power level, load and discharge rate, etc.

Further, the IoT micro-service devices 10a-10e may communicate with a device connectivity middleware (DCM) node 14, which holds a network profile of each IoT device 11a-11c e.g. for subscriber identity module (SIM) provisioning in case of mobile IoT devices. The network profile stipulates which QoS of an IoT device will be granted in terms of e.g. allowed services to be accessed, maximum allowed bit rate or allowed traffic class, latency, etc.

Upon having received the network profile of an IoT device 11a-11c, an IoT micro-service device 10a-10e may obtain Quality of Service (QoS) information of the IoT device 11a-11c by transmitting the network profile information to a device referred to as a Service Capability Exposure Function (SCEF) 15.

The SCEF 15 is a key entity within the 3rd Generation Partnership Project (3GPP) architecture for service capability exposure that provides a means to securely expose the services and capabilities provided by 3GPP network interfaces. SCEF 15 resides either on the edge of an IoT domain or completely within the IoT domain, interfacing with an external API Management Platform at the edge. The functionality of the SCEF 15 is descried in detail in e.g. 3GPP specification TS 23.682.

After having received the network profile information from an IoT micro-service device 10a-10e, the SCEF 15 will in its turn will transmit the network profile information to a Policy and Charging Control, (PCC) function 16, where the network profile information is mapped to a QoS measure for the IoT device 11a-11c associated with the received network profile information. In practice, the PCC function 16 may be embodied by entities like a Policy and Charging Control Function (PCRF) and a Policy and Charging Enforcement Function (PCEF).

Further, the network of FIG. 1 optionally comprises an IoT service managing device 17 which is used for collecting the QoS measures and availability information acquired by the different IoT micro-service device 10a-10e for an overall view of the QoS situation of the IoT devices 11a-11c in order to provide a service-oriented architecture (SOA).

Figure 2:
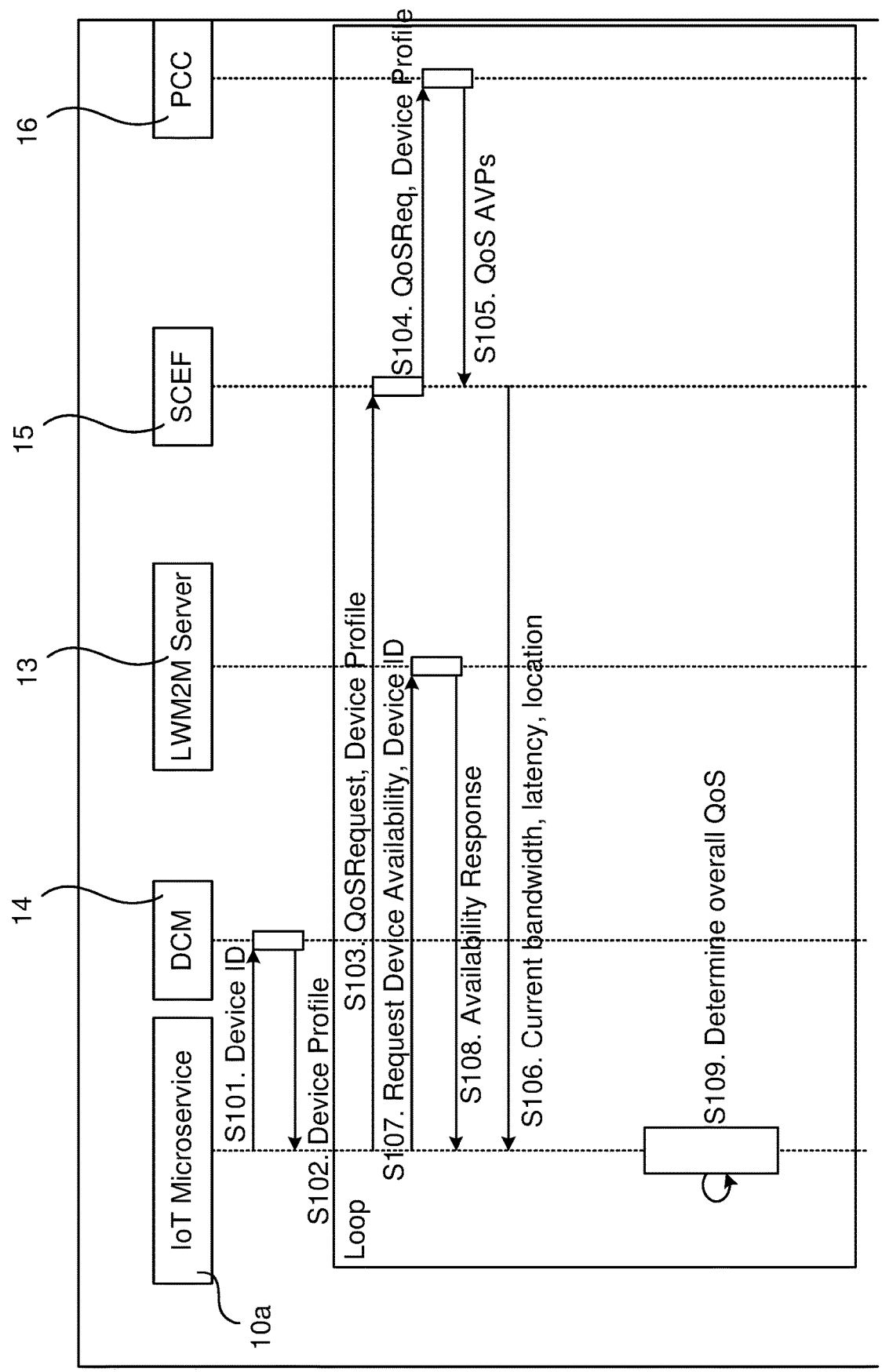
FIG. 2 shows a signaling diagram illustrating a method of a micro-service device of acquiring a QoS measure of an IoT device according to an embodiment.

FIG. 2 shows a signaling diagram illustrating a method of an IoT micro-service device 10a of acquiring a QoS measure of an IoT device 11a according to an embodiment.

In a first step S101, the IoT micro-service device 10a transmits an identifier of at least one IoT device 11a for which QoS information is to be acquired to the DCM node 14. It is noted that the IoT micro-service device 10a may request QoS measures for a great number of IoT devices 11a, and not just a single one as disclosed in FIG. 2, in which case it could provide the DCM node 14 with a corresponding number of identifiers.

In step S102, the DCM node 14 responds by transmitting the network profile of the IoT device 11a, such that a QoS measure of the IoT device 11a subsequently can be obtained from the 3GPP network 12 by the micro-service device.

After having received the network profile, the IoT micro-service device 10a transmits a request for the QoS measure of the IoT device 11a comprising the network profile to the SCEF 15 in step S103, which in its turn will forward the request to the PCC function 16 in the 3GPP network 12 in step S104.

The PCC function 16 stores QoS information associated with the received network profile of the concerned IoT device 11a and accordingly fetches a QoS measure, commonly referred to as QoS Attribute Value Pairs (AVPs), from a storage referred to as a Service Profile Repository (SPR) of the PCC function 16 and returns the QoS measure to the SCEF 15 in step S105, which forwards the received QoS measure to the IoT micro-service device 10a in step S106.

Hence, the IoT micro-service device 10a now has access to the requested QoS measure of the IoT device 11a, which is based on parameters such as for instance bandwidth, latency and location of the IoT device 11a, or a combination of a plurality of parameters.

Further, the IoT micro-service device 10a transmits a request for availability information of the IoT device 11a to the LWM2M server 13 in step S107. As previously discussed, communication between the IoT micro-service device 10a and the LWM2M server 13 is undertaken using the Open Mobile Alliance (OMA) LWM2M protocol.

The LWM2M server 13 fetches the availability information of IoT device 11a from an internal storage and returns the availability information to the IoT micro-service device 10a in step 108. As previously discussed, the availability information comprises for instance current battery power level, load and discharge rate, etc., of the IoT device 11a.

The IoT micro-service device 10a now has access to both a QoS measure of the IoT device 11a as well as availability information of the IoT device 11a. Advantageously, with the described embodiment, an overall QoS can be determined for the IoT device 11a.

For instance, the QoS measure may indicate that the IoT device 11a is capable of acquiring data and transmitting such data to the micro-service device 10a at a high bandwidth. However, the availability information may indicate that the IoT device 11a is close to running out of battery power. This may affect the overall QoS of the IoT device 11a in the sense that the overall QoS of the IoT device 11a may decrease when taking into account the poorer availability as compared to a scenario where only the (high) QoS bandwidth figure is taken into account.

Further advantageous, with the described embodiment, it is possible for the IoT micro-service devices 10a-10e to supervise and coordinate resources of the IoT devices 11a-

11c. This may be performed by having the IoT micro-service devices 10a-10e intercommunicate with each other to build large-scale IoT applications.

In a further embodiment to be discussed in the below, the IoT service managing device 17 may collect the QoS measures and availability information of the IoT devices 11a-11c and thus handle the supervision and coordination of IoT device resources.

The overall QoS of a large-scale IoT application will depend on the QoS of the respective IoT device forming part of the application.

The acquiring of the QoS measures of the IoT devices 11a-11c is performed via a network path to the PCC function 16 by means of the network profiles of the IoT devices 11a-11c, while the availability information and raw data of the IoT devices 11a-11c are acquired using the device identifier via a data path implemented by means of a standard protocol such as the LWM2M protocol.

The power state of the IoT devices 11a-11c decides the availability of the raw data from the device. This is further constrained by the actual telecommunication network 12, for instance stipulated by the network profile registered for an IoT device at the PCC function 16 which determines availability and bandwidth of the IoT device 11a.

Hence, the total QoS of an IoT device 11a is a function of parameters acquired both via the data path and the via network path. Further, since both paths have variability over time and location, the total QoS is a function of time and location.

Advantageously, IoT applications may be given access to a number of 3GPP services through the SCEF 15. These include IoT device triggering, IoT device power saving, radio access network (RAN) parameter tuning, monitoring, group message delivery, etc. One or more of these parameters may be acquired to determine latency and bandwidth of an IoT device 11a.

With reference to FIG. 2, steps S103-S107 may advantageously be performed repeatedly for an IoT device 11a, the network profile of which is acquired in step S101 and S102, such that the QoS measure and the availability information of the IoT device(s) 11a-11c are regularly updated to estimate an adequate overall QoS for the IoT device(s) 11a-11c.

It should be noted that the IoT micro-service device 10a may perform the communication of steps S103 and S106 with the SCEF 15 simultaneously with the communication of steps S106 and S107 with the LWM2M server 13, or in a reversed order as compared to that shown in FIG. 2.

Again with reference to FIG. 1, as was discussed hereinabove, in order to effectively supervise and coordinate resources of the IoT devices 11a-11c forming part of an IoT application, the IoT service managing device 17 may collect the QoS measures and availability information of the IoT devices 11a-11c from the IoT micro-service devices 10a-10e. In such an embodiment, the IoT service managing device 17 will advantageously be capable of drawing conclusions as regards the total QoS situation of the IoT application. For instance, the IoT service managing device 17 may concluded that a part of the IoT network formed by a first subset of IoT devices currently has low availability and thus should not—at least temporarily—be burdened with the task of providing data. The IoT service managing device 17 may concurrently conclude that a different, second subset of IoT devices indeed has an adequate QoS, and is instead called upon to deliver said data.

Hence, the IoT service managing device 17 may direct an IoT application to the second subset of IoT devices for a requested service, if the device comes to the conclusion that the QoS provided by the second subset of IoT devices is superior to that of the first subset of IoT devices.

Figure 3:
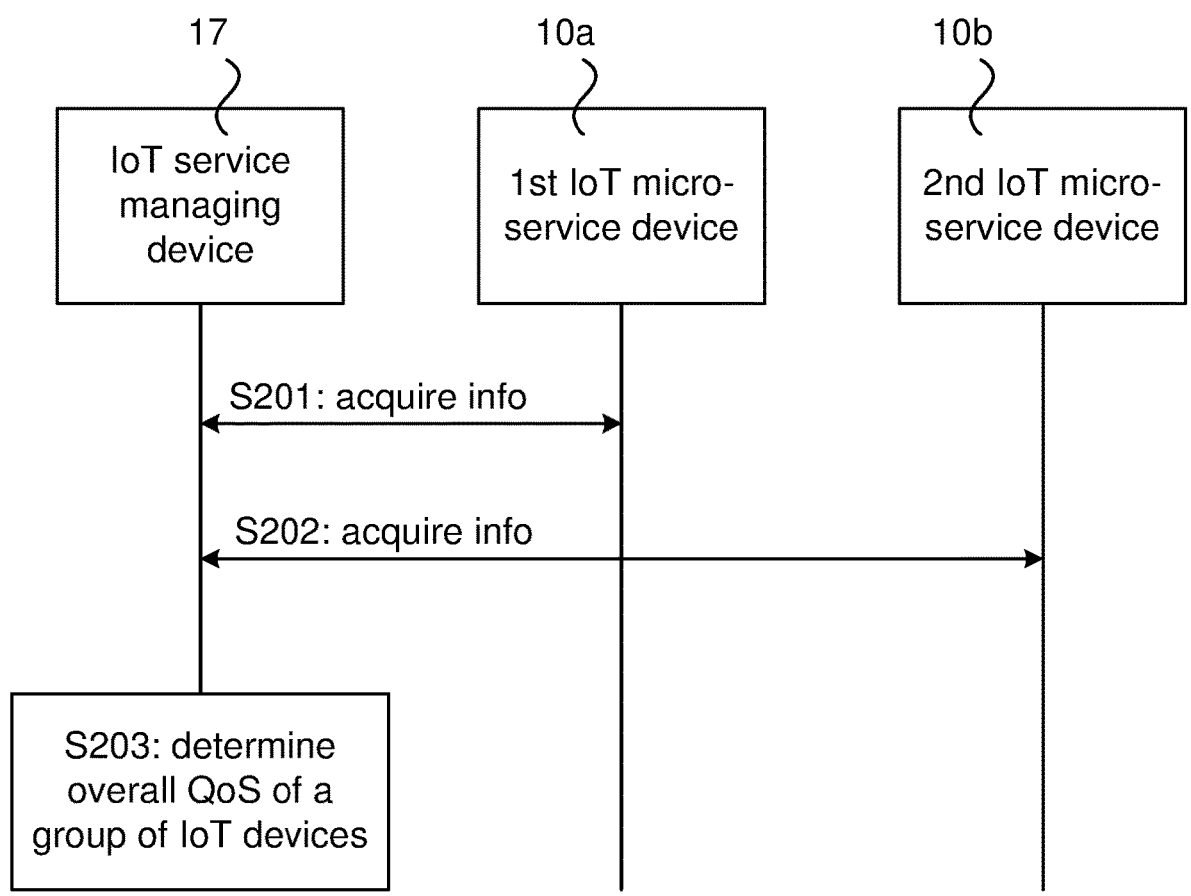
FIG. 3 shows a signaling diagram illustrating an IoT service managing device collecting QoS measures and availability information of a plurality of IoT devices from a group of IoT micro-service devices according to an embodiment.

FIG. 3 shows a signaling diagram illustrating the embodiment where the IoT service managing device 17 collects the QoS measures and availability information of a plurality of IoT devices 11a-11c from a group of IoT micro-service devices 10a-10e.

Hence, after e.g. a first IoT micro-service device 10a and a second IoT micro-service device 10b has performed the process of FIG. 2, collecting the QoS measures and availability information of a plurality of IoT devices 11a-11c, the IoT service managing device 17 acquires, from the first IoT micro-service device 10a, the QoS measure and the availability information of for instance a first and a second of the IoT devices 11a and 11b in step S201.

Then, in step S202, the IoT service managing device 17 acquires the QoS measure and the availability information of for instance a third of the IoT devices 11c from the second IoT micro-service device 10b.

From the information acquired in steps S201 and S202, the IoT service managing device 17 determines in step S203 an overall QoS for the group of IoT devices 11a-11c.

It should be noted that the actual determination of current overall QoS of an individual IoT device based on a QoS measure of the IoT device and its availability information can be computed in many different ways, and the various possible computations are per se beyond the scope of this invention.

In a further embodiment, the IoT micro-service devices 10a-10e and/or the IoT service managing device 17 may advantageously predict a future overall QoS for an individual IoT device or for a group of IoT devices 11a-11c based and the determined current overall QoS.

For instance, by analyzing a current battery charge level of a particular IoT device 11a-11c, an IoT micro-service device 10a-10e and/or the IoT service managing device 17 may predict that the battery will be more or less discharged after a given time period, which obviously will affect the overall QoS of the particular IoT device 11a-11c.

In another example, bandwidth capability of a certain device on a given hour of the day or week may be predicted. For some parameters to be predicted, it may be necessary to take into account a set of determined historical overall QoS values.

Hence, the prediction model is implemented in the IoT micro-service devices 10a-10e and/or in the IoT service managing device 17. The prediction model can be configured for any period (seasonality such as time-of-day, day-of-week, etc.). For a given a time of day in the future, the model may predict values of availability, bandwidth and latency of access to a given IoT device 11a-11c.

There are many methods available for predicting data, and commonly machine learning models are utilized.

Figure 4:
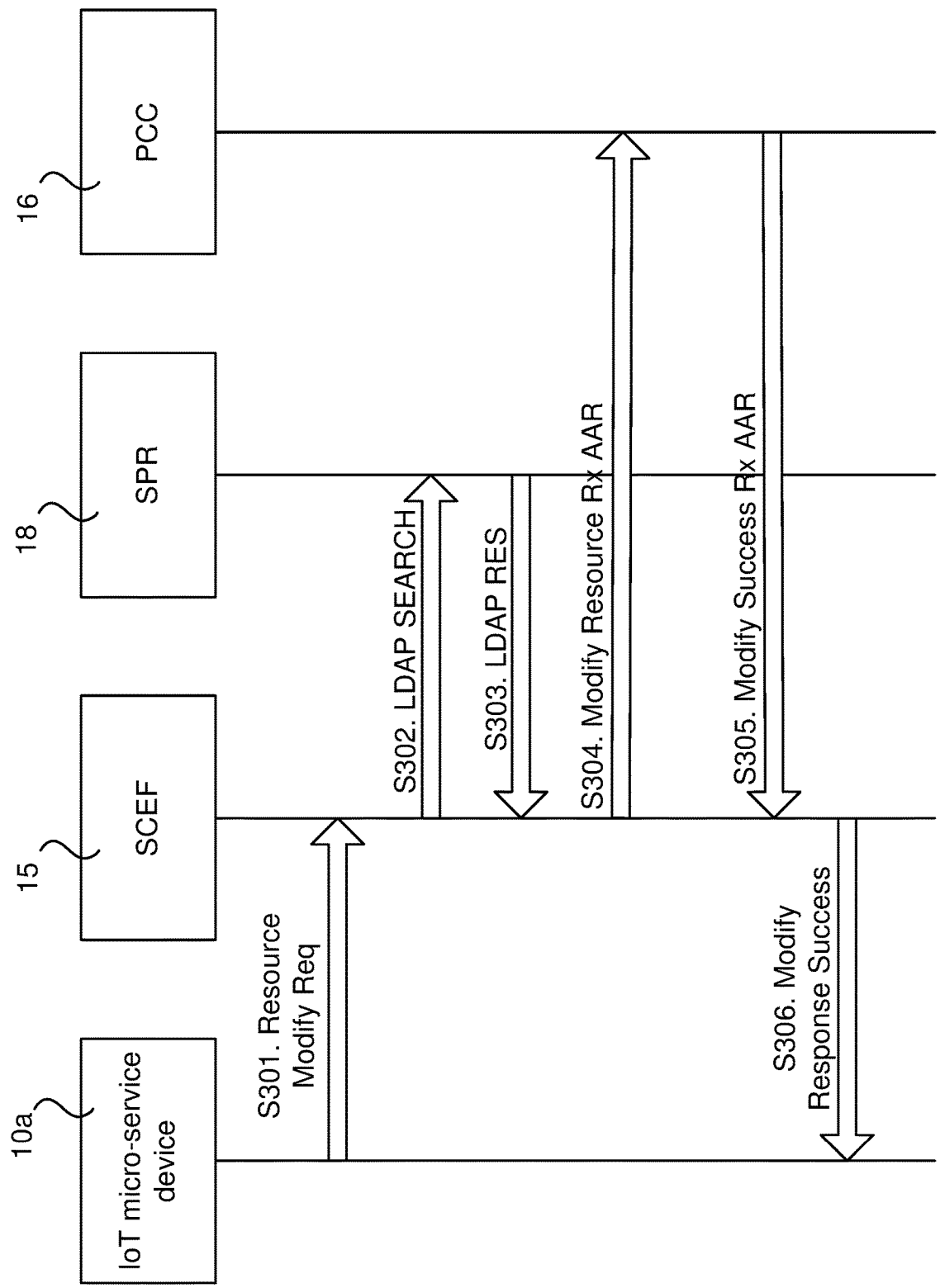
FIG. 4 shows a signaling diagram illustrating a method of an IoT micro-service device of acquiring a QoS measure of an IoT device according to an embodiment.

FIG. 4 shows a signaling diagram illustrating an embodiment of an IoT micro-service device 10a acquiring a QoS measure of an IoT device 11a-11c (as described in FIG. 1) via an SCEF 15.

In a first step S301, the IoT micro-service device 10a sends a Resource Modify Request message to the SCEF 15. With this Resource Modify Request message, the IoT micro-service device 10a requests a QoS measure of the IoT device 11a-11c (cf. step S103 of FIG. 2) from the SCEF 15, which request comprises the network profile of the IoT device.

The SCEF 15 transmits the QoS measure request in the form of a Lightweight Directory Access Protocol (LDAP) SEARCH message to a Service Profile Repository (SPR) 18 in step S302, which will return adequate parameters of the request in an appropriate LDAP Data Interchange Format (LDIF) to the SCEF 15 in step S303 with an LDAP RES message.

The SCEF 15 thus transmits the LDIF QoS measure request to the PCC 16 (cf. step S104 of FIG. 2) in the form of a Modify Resources message, i.e. a so called Rx Authorize/Authenticate-Request (AAR).

As previously discussed, the PCC function 16 stores QoS information associated with the received network profile of the concerned IoT device 11a-11c, which profile is included in the request of step S304.

Accordingly, the PCC function 16 fetches a QoS measure, commonly referred to as QoS AVPs from its storage and returns the QoS measure to the SCEF 15 in step S305 (cf. step S105 of FIG. 2) in the form of a Modify Success message, i.e. a so called Rx Authorize/Authenticate-Answer (AAA).

Finally, the SCEF 15 forwards the received QoS measure to the IoT micro-service device 10a in step S306 (cf. step S106 of FIG. 2) in the form of a Modify Response Success message.

Hence, the micro-service device 10a now has access to the requested QoS measure of the IoT device 11a-11c, which is based on parameters such as for instance bandwidth, latency and location of the IoT device, or a combination of a plurality of parameters.

With reference to FIG. 5, the steps of the method performed by the IoT micro-service device 10a of enabling determining of an overall QoS of at least one IoT device 11a-11c according to embodiments as previously has been described are in practice performed by a processing unit 20 embodied in the form of one or more microprocessors arranged to execute a computer program 21 downloaded to a suitable storage volatile medium 22 associated with the microprocessor, such as a Random Access Memory (RAM), or a non-volatile storage medium such as a Flash memory or a hard disk drive. The processing unit 20 is arranged to cause the IoT micro-service device 10a to carry out the method according to embodiments when the appropriate computer program 21 comprising computer-executable instructions is downloaded to the storage medium 22 and executed by the processing unit 20. The storage medium 22 may also be a computer program product comprising the computer program 21. Alternatively, the computer program 21 may be transferred to the storage medium 22 by means of a suitable computer program product, such as a Digital Versatile Disc (DVD) or a memory stick. As a further alternative, the computer program 21 may be downloaded to the storage medium 22 over a network. The processing unit 20 may alternatively be embodied in the form of a digital signal processor (DSP), an application specific integrated circuit (ASIC), a field-programmable gate array (FPGA), a complex programmable logic device (CPLD), etc.

With reference to FIG. 6, the steps of the method performed by the an IoT service managing device 17 of determining an overall QoS for a group of IoT devices 11a-11c from QoS measures and availability information acquired by at least two IoT micro-service devices 10a-10e of the type illustrated in FIG. 5 according to embodiments as previously has been described are in practice performed by a processing unit 30 embodied in the form of one or more microprocessors arranged to execute a computer program 31 downloaded to a suitable storage volatile medium 32 associated with the microprocessor, such as a RAM, or a non-volatile storage medium such as a Flash memory or a hard disk drive. The processing unit 30 is arranged to cause the IoT service managing device 17 to carry out the method according to embodiments when the appropriate computer program 31 comprising computer-executable instructions is downloaded to the storage medium 32 and executed by the processing unit 30. The storage medium 32 may also be a computer program product comprising the computer program 31. Alternatively, the computer program 31 may be transferred to the storage medium 32 by means of a suitable computer program product, such as a DVD or a memory stick. As a further alternative, the computer program 31 may be downloaded to the storage medium 32 over a network. The processing unit 30 may alternatively be embodied in the form of a DSP, an ASIC, an FPGA, a CPLD, etc.

FIG. 7 illustrates an IoT micro-service device 10a according to an embodiment. The IoT micro-service device 10a comprises transmitting means 40 adapted to transmit to a DCM node, an identifier of at least one IoT device 11a-11c for which a QoS measure is to be acquired, receiving means 41 adapted to receive, from the DCM node, a network profile of the IoT device associated with said identifier, transmitting means 42 adapted to transmit, to an SCEF, a request for the QoS measure of the IoT device for the received network profile, receiving means 43 adapted to receive, from the SCEF, the requested QoS measure of the IoT device, transmitting means 44 adapted to transmit, to a LWM2M device, a request for availability information for said at least one IoT device, and receiving means 45 adapted to receive, from the LWM2M device, the requested availability information, wherein the received QoS measure and the availability information is taken into account for determining the overall QoS of said at least one IoT device.

The means 40-45 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

FIG. 8 illustrates an IoT service managing device 17 according to an embodiment. IoT service managing device 17 comprises acquiring means 50 adapted to acquire, from a first of at least two IoT micro-service devices 10a-10e, the QoS measure and the availability information of a first of at least two IoT devices 11a-11c, acquiring means 51 adapted to acquire, from a second of the at least two IoT micro-service devices 10a-10e, the QoS measure and the availability information of a second of the at least two IoT devices, and determining means 52 adapted to determine an overall QoS for the group of at least two IoT devices 11a-11c based on the individual QoS measure and availability information of the first IoT device 11a and the individual QoS measure and availability information of the second IoT device 11b.

The means 50-52 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a network node for enabling determination of an overall Quality of Service (QoS) for an Internet of Things (IoT) device, comprising:
the network node transmitting, to a device connectivity middleware (DCM) node, a first request message comprising an identifier (ID) of the IoT device;
the network node receiving, from the DCM node, a first response message responsive to the first request message, the first response message comprising a network profile of the IoT device;
after receiving the first response message comprising the network profile of the IoT device, the network node transmitting, to a Service Capability Exposure Function (SCEF), a second request message comprising the received network profile of the IoT device;
the network node receiving, from the SCEF, a second response message response to the second request message, the second response message comprising a QoS measure associated with the network profile of the IoT device, wherein the SCEF acquired the QoS measure from a Policy and Charging Control (PCC) function which determined the QoS measure based on the network profile of the IoT device;
the network node transmitting, to a Lightweight Machine-to-Machine (LWM2M) device, a third request message requesting availability information for the IoT device;
the network node receiving, from the LWM2M device, a third response message responsive to the third request message, the third response message comprising the requested availability information; and
the network node determining the overall QoS of the IoT device based on the received QoS measure and the availability information.

2. The method of claim 1,
wherein
the availability information for the IoT device comprises battery level information indicating a battery power level of the IoT device, and
the overall QoS for the IoT device is determined based on the indicated battery power level.

3. The method of claim 2, wherein the determining of the overall QoS further comprises:
predicting a future overall QoS from the determined overall QoS values.

4. The method of claim 1, wherein at least two of said network node perform intercommunication to determine an overall QoS as provided by a group of IoT devices.

5. A computer program product comprising a non-transitory computer readable medium storing a computer program comprising instructions which when executed by processing circuitry of a network node causes the network node to perform the method of claim 1.

6. The method of claim 1, wherein
the availability information for the IoT device comprises load information indicating a load of the IoT device, and
the overall QoS for the IoT device is determined based on the indicated load.

7. The method of claim 1, wherein
the availability information for the IoT device comprises discharge rate information indicating a discharge rate of the IoT device, and
the overall QoS for the IoT device is determined based on the indicated discharge rate.

8. A method of an Internet of Things (IoT) service managing device for determining an overall QoS for a first group of IoT devices comprising a first IoT device and a second IoT device, the method comprising:
acquiring a first QoS measure for the first IoT device;
acquiring first availability information for the first IoT device;
acquiring a second QoS measure for the second IoT device;
acquiring second availability information for the second IoT device;
determining an overall QoS for the first group of IoT devices based on the first QoS measure for the first IoT device, the second QoS measure for the second IoT device, the first availability information for the first IoT device, and the second availability information for the second IoT device;
determining that the overall QoS for the first group of IoT devices is less than a threshold;
after determining that the overall QoS for the first group of IoT devices is less than the threshold, determining whether an overall QoS for a second group of IoT devices is greater than the threshold;
as a result of determining that the overall QoS for a second group of IoT devices is greater than the threshold, directing an IoT application to the second group of IoT devices; and
as a result of determining that the overall QoS for a first group of IoT devices is less than the threshold, refraining from directing the IoT application to the first group of IoT devices.

9. The method of claim 8, wherein the determining of the overall QoS further comprises:
predicting a future overall QoS from determined overall QoS.

10. A computer program product comprising a non-transitory computer readable medium storing a computer program comprising instructions which when executed by processing circuitry of an Internet of Things (IoT) service managing device causes the IoT service managing device to perform the method of claim 8.

11. The method of claim 8, wherein
the first IoT device comprises a battery,
the first availability information for the first IoT device comprises information about the first IoT device's battery, and
the information about the first IoT device's battery comprises information indicating at least one of: a power level, a load, or a discharge rate for the battery.

12. A network node configured to enable determining of an overall Quality of Service (QoS) of an Internet of Things (IoT) device, the network node comprising a processing unit and a memory, wherein the network node is configured to:
transmit, to a device connectivity middleware (DCM) node, a first request message comprising an identifier (ID) of the IoT device;
receive, from the DCM node, a first response message responsive to the first request message, the first response message comprising a network profile of the IoT device associated with said identifier;
transmit, to a Service Capability Exposure Function (SCEF), a second request message comprising the received network profile;
receive, from the SCEF, a second response message responsive to the second request message, the second response message comprising a QoS measure associated with the network profile of the IoT device, wherein the SCEF acquired the QoS measure from a Policy and Charging Control (PCC) function which determined the QoS measure based on the network profile of the IoT device;

transmit, to a Lightweight Machine-to-Machine (LWM2M) device, a third request message requesting availability information for the IoT device;

receive, from the LWM2M device, a third response message responsive to the third request message, the third response message comprising the requested availability information; and determine the overall QoS of the IoT device based on the received QoS measure and the availability information.

13. The network node of claim 12,
wherein
the availability information for the IoT device comprises battery level information indicating a battery power level of the IoT device, and
the overall QoS for the IoT device is determined based on the indicated battery power level.

14. The network node of claim 13, further being operative to, when determining the overall QoS:
predict a future overall QoS from a set of determined overall QoS values.

15. The network node of claim 12, further being operative to communicate with a further network node of the same type to perform intercommunication in order to determine an overall QoS as provided by a group of IoT devices.

16. An Internet of Things (IoT) service managing device configured to determine an overall QoS for a first group of IoT devices comprising a first IoT device and a second IoT device, the IoT service managing device comprising a processing unit and a memory, wherein the IoT service managing device is configured to:
acquire a first QoS measure for the first IoT device;
acquire first availability information for the first IoT device;
acquire a second QoS measure for the second IoT device;
acquire second availability information for the second IoT device; and
determine an overall QoS for the first group of IoT devices based on the first QoS measure for the first IoT device, the second QoS measure for the second IoT device, the first availability information for the first IoT device, and the second availability information for the second IoT device;
determine that the overall QoS for the first group of IoT devices is less than a threshold;
after determining that the overall QoS for the first group of IoT devices is less than the threshold, determine whether an overall QoS for a second group of IoT devices is greater than the threshold;
as a result of determining that the overall QoS for a second group of IoT devices is greater than the threshold, direct an IoT application to the second group of IoT devices; and
as a result of determining that the overall QoS for a first group of IoT devices is less than the threshold, refrain from directing the IoT application to the first group of IoT devices.

17. The IoT service managing device of claim 16, further being operative to, when determining the overall QoS:
predict a future overall QoS from a set of determined overall QoS values.

18. The IoT service managing device of claim 16, wherein
the first IoT device comprises a battery,
the first availability information for the first IoT device comprises information about the first IoT device's battery, and
the information about the first IoT device's battery comprises information indicating at least one of: a power level, a load, or a discharge rate for the battery.

* * * * *